United States Patent Office 3,676,100
Patented July 11, 1972

3,676,100
PROCESS FOR PRODUCING A STABILIZED
SUSPENSION NPK, NP OR PK FERTILIZER
Wilfred Gerhardt, Knapsack, near Cologne, and Heinz Harnisch, Lovenich, near Cologne, Germany, assignors to Knapsack Aktiengesellschaft, Knapsack, near Cologne, Germany
No Drawing. Filed Feb. 19, 1970, Ser. No. 12,860
Claims priority, application Germany, Feb. 21, 1969,
P 19 08 721.9
Int. Cl. C05b 21/00
U.S. Cl. 71—37                    3 Claims

ABSTRACT OF THE DISCLOSURE

Production of stabilized NPK-, NP- or PK-suspension fertilizers having an overall nutrient concentration of at least 20 grams, preferably more than 30 grams, per 100 grams suspension fertilizer. The stabilizer in the fertilizers is a neutralization sludge obtained in the neutralization of crude phosphoric acid produced by wet-processing treatment of phosphate ores with the use of an alkali liquor and/or ammonia.

---

The term suspension fertlizer or fertilizer suspension normally defines a more or less neutral aqueous solution of fertilizer salts containing phosphorus oxide and optionally nitrogen compounds and/or potassium compounds. The various fertilizers are subdivided into nitrogen/phosphorus/potassium (NPK)-fertilizers, nitrogen/phosphorus (NP)-fertilizers and phosphorus/potassium (PK)-fertilizers and identified by their respective N, $P_2O_5$ and $K_2O$-content in weight percent. Especially at temperatures around 0° C. or at lower temperatures, the above fertilizer solutions having about 30 percent fertilizer salts therin are found to be supersaturated with the result that crystallized matter then commences to be separated therefrom. These highly undesirable disintegration phenomena, which inter alia tend to clog or soil the apertures of fertilizer spray systems, can be avoided by the addition of various stabilizers. In U.S. Pats. 3,096,170; 3,109,729 and 3,160,495, it has been suggested that attapulgites and/or bentonites be used as fertilizer suspension stabilizers. The stabilizers described in U.S. Pat. 3,179,496 include chemically very different materials, more particularly colloidal silicic acid, colloidal aluminum oxide, nontmorillonite and attapulgites. The suspension fertilizers described in U.S. Pat. 3,326,666 contain finely ground, water-insoluble superphosphate as a phosphate component and stabilizer together with further suspended or dissolved nutrient salts. For a stabilized suspension fertilizer, it is advantageous to contain at least 20 weight percent nutrient salt and to combine slight disintegration during storage with low viscosity and small screenings (20 mesh sieve).

It has now unexpectedly been found that so-called neutralization sludge such as that obtained in the production of purified alkali metal and/or ammonium phosphate solutions by neutralization with crude phosphoric acid (i.e. wet-processed phosphoric acid obtained by wet-processing treatment of calcium phosphates originating from various sources with sulfuric acid) and treatment with an alkali liquor or ammonia is a very good stabilizer for suspension fertilizers.

Despite various experiments and suggestions for use of neutralization sludge, it has often been discarded heretofore as being a commercially useless product. It has now been found, however, that the use of neutralization sludge as a suspension fertilizer stabilizer offers a particular advantage, namely that the citrate-soluble phosphate therein, which is a nutrient salt, is made available to the plant. Depending on the source of origin of the calcium phosphate and the purity of the sulfuric acid, the neutralization sludges obtained by the neutralization of wet-processed phosphoric acid, are generally found to have substantially the following chemical composition in weight percent:

40–60% water,
10–50% sodium phosphate,
5–15% aluminum phosphate,
2–10% iron phosphate,
1–5% titanium phosphate,
1–5% calcium phosphate,
0–5% magnesium phosphate,
balance: customary contaminants (fluoride, sulfate, organic substances, chromium, vanadium, manganese).

The moist sludges accordingly contain between about 10 and 40 weight percent $P_2O_5$.

A sludge obtained by neutralization of crude phosphoric acid (produced from Kola phosphate and sulfuric acid) with sodium hydroxide solution was analyzed and found to have the following chemical composition in weight percent:

40% $H_2O$ (loss on drying at 110° C.),
47% $H_2O$ (loss on drying at 800° C.),
29% $P_2O_5$,
13% $Na_2O$,
4% $Al_2O_3$,
2.5% $Fe_2O_3$,
0.6% $TiO_2$,
0.5% CaO,
0.2% MgO,
2% Fe,
0.1% $SO_3$.

The NPK-, NP- and PK-suspension fertilizers having a neutralization sludge stabilizer therein can be produced in the following manner.

The neutralization sludge is mixed with agitation at 50 to 90° C. with a mineral acid, e.g. sulfuric acid, nitric acid, hydrochloric acid and/or phosphoric acid, the phosphoric acid being produced by either wet-processing treatment or thermal processing treatment. The temperature of between 50 and 90° C. is produced by the supply of steam or gaseous ammonia with utilization of the heat of neutralization. In carrying out the pre-neutralization step care should conveniently be taken to ensure that the pH-value does not exceed 1.0. Failing this, the periods needed to achieve dissolution would become excessively long.

The treatment steps following pre-neutralization can be carried out continuously or intermittently.

In the case of discontinuous operation, it is possible for the NPK-, NP- or PK-fertilizer solution to be diluted with water which is added at a rate consistent with the concentration desired to be produced. Following this, aqueous or gaseous ammonia is added until a pH-value of between 5 and 9 is found to have been reached. The temperature is maintained between 30 and 50° C., by cooling. The resulting mixture may be mixed with further fertilizer salts including $NH_4^+$, $K^+$ or trace elements, namely their chlorides, sulfates, nitrates, phosphates, carbonates, hydroxides or acetates, which may be used in solid, dissolved or suspended form. In addition thereto the fertilizer suspensions can be used in further combination with nitrogen-containing components including formamide, urea or urea derivatives, for example urea condensation products with aldehydes, such as formaldehyde, crotonaldehyde, isobutyraldehyde, which are solubility retarders and can be added individually or collectively.

In the case of continuous operation, the starting material is a finished fertilizer suspension portion to which are added simultaneously all of the feed materials, namely (a) the mixture of neutralization sludge and mineral acid, which may have been pre-neutralized with ammonia, (b) the fertilizer salts specified hereinabove, and (c) ammonia at a rate such that the pH-range of between 5 and 9 established for the fertilizer suspension portion be maintained. The temperature of the suspension is maintained between 30 and 50° C., by cooling. Finished fertilizer suspension is continuously removed at a rate consistent with the quantities of feed material added. This continuous process should preferably be used for the production of highly concentrated fertilizer suspensions with an overall nutrient concentration of more than 35 weight percent.

The present invention provides more especially stabilized NPK-, NP- or PK-suspension fertilizers having an overall nutrient concentration of at least 20 grams, preferably more than 30 grams, per 100 grams suspension fertilizer and containing a neutralization sludge stabilizer obtained in the neutralization of crude phosphoric acid produced by wet-processing treatment of phosphate ores by means of an alkali liquor and/or ammonia. The stabilized suspension fertilizer should preferably contain between 5 and 60 weight percent moist neutralization sludge, which is generally composed of water, sodium phosphate, potassium phosphate, ammonium phosphate, aluminum phosphate, iron phosphate, titanium phosphate, calcium phosphate and eventually magnesium phosphate and customary contaminants.

A stabilized suspension fertilizer can be produced by mixing the neutralization sludge, at 50 to 90° C. and with agitation, with a mineral acid, which preferably is phosphoric acid, diluting the resulting mixture with water, introducing ammonia thereinto until a pH-value of between 5 and 9 is found to have been established, and adding further fertilizer salts to the mixture, if desired or convenient. It is also possible for the neutralization sludge to be mixed at 50 to 90° C. and with agitation with a mineral acid, which preferably is phosphoric acid, and for the resulting mixture to be introduced together with fertilizer salts and ammonia into a finished suspension fertilizer portion at a rate such that the pH-value established for the suspension fertilizer portion be maintained between 5 and 9. The dissolution temperature of between 50 and 90° C. can be produced by the introduction of gaseous ammonia into the mixture of neutralization sludge and mineral acid until a maximum pH-value of 1.0 is found to have been established.

EXAMPLE 1

0.425 kg. neutralization sludge (21% $P_2O_5$ was mixed with 1.5 kg. wet-processed phosphoric acid (28.5% $P_2O_5$) and 50 normal liters (measured at S.T.P.) gaseous $NH_3$ were introduced thereinto. The temperature was found to increase from 21 to 55° C. Following this, hot steam was used to heat the mixture up to a temperature of 80° C., at which it was found to have been substantially dissolved. After having been cooled down to 40° C., the slightly turbid solution (=1.9 kg.) was subdivided into four equal portions. 100 grams solution portions were derived from each quarter and a pH-value of 6.5; 7.0; 8.0 and 8.5, respectively, was established by means of gaseous ammonia. At 45 to 50° C., the solution balance portion and a hot solution of 300 grams ammonium nitrate in 0.167 kg. water were introduced simultaneously into each of the four portions; the solutions were added at a rate such that the pH-value of 6.5; 7.0; 8.0 and 8.5, respectively, was maintained upon the introduction of further ammonia gas. Altogether 220 normal liters ammonia were used for a pH-value of 6.5 and altogether 330 normal liters ammonia were used for a pH-value of 8.5. The results obtained are indicated in the following Table I.

TABLE I
Influence of pH-value on fertilizer suspension

| No. | Quantity of fert. suspension obtained in grams | pH-value | Rate of disintegration in percent | Viscosity, cp. | Screenings in percent | Flowability | Dispersibility |
|---|---|---|---|---|---|---|---|
| 1 | 955 | 6.5 | 15 | 18 | 0 | Good | Good. |
| 2 | 958 | 7.0 | 7 | 21 | 0 | do | Do. |
| 3 | 961 | 8.0 | 4 | 33 | 0 | Satisfactory. | Satisfactory. |
| 4 | 965 | 8.5 | 3 | 41 | 0 | do | Do. |

The final fertilizer suspensions contained substantially 11 weight percent moist neutralization sludge.

Specimen 3 was subjected to chemical analysis and found to contain 14.3% N, 10.2% $P_2O_5$ (water-soluble), and 13.6% $P_2O_5$ (citrate-soluble).

The physical data were determined on fertilizer suspensions allowed to stand over a period of 28 days.

Physical data determined:

(1) Rate of disintegration. A 100 milliliter glass measuring cylinder was filled up to the 100 milliliter mark with the fertilizer suspension to be tested. The degree of distintegration in percent is defined as being the volumetric relation, multiplied with the factor 100, between the upper clear solution layer and the overall quantity of fertilizer suspension (=100 milliliters).

(2) The viscosity of the homogenized fertilizer suspension was tested with a "Viscotester V 180" of Messrs. Haake, Berlin, at a speed of 187.5 rev./minute. A temperature of 20° C.±0.5° C. was established for the suspension with the use of a thermostat relay.

(3) The screenings were determined on a 20 mesh sieve (meshes 0.84 mm. wide). A given quantity of fertilizer suspension was poured onto the sieve and shaken for a period of 15 minutes using a shaking apparatus. The sieve was rinsed using ice water, which was used in a quantity as large as the quantity of test suspension, and washed with 100 milliliters methanol. The sieve was dried at 120° C. in a drying cabinet. The screenings retained on the sieve were weighed and the weight relation between screenings and suspension was defined as being the screenings in percent.

(4) The flowability was tested on the sievede material. The fertilizer suspension to be tested was passed through a funnel, of which the shaft was 5 cm. long and 0.25 cm. wide. The flowability was evaluated on the flow time. A suspension of 100 milliliters flowing through the funnel within 1 minute is rated as having a good flowability. A suspension of 100 milliliters flowing through the funnel within 5 minutes is rated as having a satisfactory flowability, and a suspension of 100 milliliters which needs more than 5 minutes to flow through the funnel is rated as having poor flow properties.

(5) The dispersibility of the settled suspensions was tested by stirring them with a glass rod. The dispersibility was rated as good, satisfactory or poor, depending on the ease of homogenization.

EXAMPLE 2

Varying quantities of neutralization sludge were incorporated into wet-processed phosphoric acid and the resulting solutions were treated with ammonia to establish a pH-value of 7. Corresponding amounts of water and ammonium nitrate were added to maintain a concentration of 15 percent nitrogen and 15 percent citrate-soluble $P_2O_5$, in the suspension. The ammonia-treatment was carried out at a temperature of 40° C.

at 35° C., by cooling it. The final suspension had a pH-value of 7. The following values were determined by chemical analysis: 11.5% $P_2O_5$ (citrate-soluble), 12.0% N. The fertilizer suspension contained 57 weight percent moist neutralization sludge. The rate of disintegration was 5 percent, the viscosity 46 centipoises and the screenings 1 percent. The suspension was found to have a good flowability and a satisfactory dispersibility.

EXAMPLE 5

0.300 kg. neutralization sludge (obtained in the production of $(NH_4)_2HPO_4$ from wet-processed phosphoric acid and containing 33% $P_2O_5$ and 15.5% $NH_4^+$) was dissolved in 1 kg. wet-processed phosphoric acid (28.5%

TABLE II

Influence exerted by the quantity of neutralization sludge on the suspension

| No. | Neutralization sludge, kg. | Wet-processed phosphoric acid, kg. | Fertilizer suspension obtained kg. | Moist neutralization sludge in fertilizer suspension weight percent | Rate of disintegration, percent | Viscosity, cp. | Screenings, percent | Flowability | Dispersibility |
|---|---|---|---|---|---|---|---|---|---|
| 5 | | 1.0 | 1.9 | | 39 | 4 | 19 | Satisfactory | Satisfactory. |
| 6 | 0.1 | 1.0 | 2.0 | 5 | 25 | 4 | 9 | ----do------ | Do. |
| 7 | 0.2 | 1.0 | 2.1 | 9.5 | 18 | 8 | 6 | Good | Good. |
| 8 | 0.4 | 1.0 | 2.38 | 16.8 | 2 | 21 | <0.1 | ----do------ | Do. |
| 9 | 0.6 | 1.0 | 2.65 | 22.6 | 1 | 31 | <0.1 | ----do------ | Do. |

EXAMPLE 3

The neutralization sludge was subjected to treatment with sodium hydroxide solution to extract soluble $P_2O_5$ therefrom. The resulting filter cake was chemically analyzed and found to contain:

35.5% $H_2O$ (loss on drying at 110° C.),
39.4% $H_2O$ (loss on drying at 800° C.),
12.5% $P_2O_5$ (citrate-soluble),
17.2% $Na_2O$,
7.3% $Al_2O_3$,
5.5% $Fe_2O_3$.

0.4 kg. of the filter cake was stirred into 0.8 kg. wet-processed phosphoric acid (29.1% $P_2O_5$) and heated to 60° C. The mixture so obtained was mixed with 0.84 kg. ammonium nitrate solution (0.1 kg. $H_2O$ and 0.74 kg. ammonium nitrate) and ammonia gas was simultaneously introduced so that the pH-value of the suspension was maintained at 8.9. The temperature of the batch was maintained at 40° C., by cooling. The suspension which was allowed to stand for 28 days had a viscosity of 52 centipoises and was free from disintegration. 1.5 grams or 0.07 weight percent screenings were retained on a 20 mesh-sieve. The following values were determined by chemical analysis: 12.0% $P_2O_5$ (citrate-soluble), 16.3% N. 2.1 kg. suspension fertilizer containing 19 weight percent moist neutralization sludge were obtained.

EXAMPLE 4

1.0 kg. neutralization sludge was digested at 60° C. and for 1 hour with 750 grams concentrated nitric acid (62% $HNO_3$). The whole was cooled down to 35° C. and 190 liters ammonia gas were introduced thereinto. The reaction mass was vigorously stirred and maintained $P_2O_5$). The resulting solution was subjected to the ammonia treatment described in Example 1, at a pH-value of 7. Suspension fertilizers with varying nutrient concentrations were obtained through the use of ammonium nitrate solutions varying in strength.

TABLE III

Influence of overall nutrient concentration on fertilizer suspension

| No. | Composition, weight percent | | | Rate of disintegration, percent | Viscosity, cp. | Screenings, percent | Flowability | Dispersibility |
|---|---|---|---|---|---|---|---|---|
| | N | $P_2O_5$ | $K_2O$ | | | | | |
| 10 | 13 | 13 | 13 | 0 | 63 | 2.3 | Poor | Satisfactory. |
| 11 | 12 | 12 | 12 | 0 | 58 | 1.9 | Satisfactory | Good. |
| 12 | 11 | 11 | 11 | 2 | 42 | 0.2 | Good | Do. |
| 13 | 10 | 10 | 10 | 4 | 36 | 0.2 | ----do------ | Do. |
| 14 | 9 | 9 | 9 | 7 | 18 | 0.1 | ----do------ | Do. |
| 15 | 8 | 8 | 8 | 10 | 14 | <0.1 | ----do------ | Do. |

The suspension obtained in Test No. 10 contained 10 weight percent moist sludge and that obtained in test No. 15 contained 6 weight percent moist sludge.

We claim:

1. A process for stabilizing NPK-, NP- or PK-suspension fertilizers having a nutrient concentration of at least 20% by weight, which comprises, mixing a sludge obtained by neutralization of wet-processed phosphoric acid in at least one mineral acid selected from the group consisting of sulfuric, nitric, hydrochloric or phosphoric acid at a temperature between 50 to 90° C. produced by introducing steam or gaseous ammonia into the mixture, producing and maintaining the pH-value of the mixture not in excess of 1.0, adding water to the solution as a diluent in an amount consistent with the concentration in the final product; thereafter adding aqueous or gaseous ammonia to the dilute solution at a temperature between 30 and 50° C. until a pH-value of between 5 and 9 is reached and mixing the mixture obtained with the components of the NPK-, NP- or PK-fertilizers with the resultant formation of a suspension containing between 5 and 60% of the said neutralization sludge.

2. The process as claimed in claim 1, wherein said sludge obtained by neutralization of wet-processed phosphoric acid, consists essentially of 40–60% $H_2O$, 10–50% sodium phosphate, 5–15% aluminum phosphate, 2–10% iron-phosphate, 1–5% titanium phosphate, 1–5% calcium phosphate, 0–5% magnesium phosphate and a remainder of contaminants selected from the group consisting of fluorides, sulfates, bromium, vanadium, manganese and organic substances.

3. The process as claimed in claim 1, wherein the components of the NKP-, NP- or PK-fertilizers include at least one substance selected from the group consisting of chlorides, sulfates, nitrates, phosphates, carbonates, hydroxides and acetates of ammoniunm and potassium, and formamide, urea and urea condensation products with aldehydes.

References Cited

UNITED STATES PATENTS

| | | | |
|---|---|---|---|
| 3,057,711 | 10/1962 | Reusser | 71—43 |
| 3,290,140 | 12/1966 | Young | 71—34 |
| 3,019,099 | 1/1962 | Walters, Jr. | 71—43 |
| 2,928,728 | 3/1960 | Weeks | 71—43 |

CHARLES N. HART, Primary Examiner

U.S. Cl. X.R.

71—43, 53, 64 C